United States Patent [19]

Woolley

[11] 4,090,283
[45] May 23, 1978

[54] METHOD OF MAKING HOLLOW GLOBULAR ROLLER

[76] Inventor: George Woolley, 135 Berlioz Shore, Apt. 1N, Nuns Island, Quebec, Canada

[21] Appl. No.: 765,427

[22] Filed: Feb. 3, 1977

Related U.S. Application Data

[62] Division of Ser. No. 631,416, Nov. 12, 1975.

[30] Foreign Application Priority Data

Oct. 22, 1975  Canada .................................. 238160

[51] Int. Cl.² ............................................. B21D 53/26
[52] U.S. Cl. .......................... 29/159 R; 29/DIG. 47; 29/460; 29/527.4; 264/263; 264/271; 301/5.3; 301/5.7
[58] Field of Search .................... 29/148.4 R, 148.4 B, 29/148.4 D, 159 R, 159.01, 460, 463, 469.5, 527.1, 527.4, 527.2, DIG. 47; 264/263, 271; 301/5.3, 5.7, 7, 99, 63 PW; 280/11.19, 11.22, 11.23, 11.24, 18 R; 16/24–28, 45; 72/267

[56] References Cited

U.S. PATENT DOCUMENTS

| | | | |
|---|---|---|---|
| 1,529,797 | 3/1925 | Gray et al. ................................ | 16/45 |
| 2,104,222 | 1/1938 | Decker ................................ | 72/267 X |
| 2,445,268 | 7/1948 | Hodgins ................................ | 29/460 |
| 2,687,260 | 8/1954 | Morin ................................ | 264/263 X |
| 3,072,169 | 1/1963 | Hastings, Jr. ........................ | 16/46 X |
| 3,170,235 | 2/1965 | Williams ................................ | 72/267 X |
| 3,757,383 | 9/1973 | Iiyoshi et al ............................ | 16/45 |
| 3,936,061 | 2/1976 | Wada ................................ | 301/5.7 X |

*Primary Examiner*—Victor A. DiPalma
*Attorney, Agent, or Firm*—Birch, Stewart, Kolasch & Birch

[57] ABSTRACT

Globular rollers are provided herein. The rollers include one globular or two semi-globular segments of rigid structurally strong material. If it is formed of two semi-globular segments, one of the semi-globular segments is provided with a male flange, and the other of the semi-globular segments is provided with a female recess. The two semi-globular segments are joined at the male flange/female recess seam. Whether it is formed of one globular or two semi-globular segments, a resilient material is coated thereon, and, if necessary permanently joining the two semi-globular segments together. The roller is also provided with a pair of diametrically opposed, aligned apertures or indentations disposed within a pair of diametrically opposed flattened chords of the globular rollers. The apertures or indentations are preferably provided with bearing surfaces, e.g. ball bearings or rollers bearings.

5 Claims, 4 Drawing Figures

METHOD OF MAKING HOLLOW GLOBULAR ROLLER

This application is a divisional of copending application Ser. No. 631,416, filed on Nov. 12, 1975.

BACKGROUND OF THE INVENTION (i) Field of the Invention

This invention relates to hollow globular rollers and to procedures for preparing the same.

(ii) Description of the Prior Art

Hollow wheels or rollers are now conventional in the art, but procedures for making such rollers have hitherto been expensive. Futhermore the roller provided was not of sufficient strength and resiliency characteristics. A roller of such type is useful for many purposes, among which are their use as rollers for the roller skate disclosed and claimed in copending application Ser. No. 631,417 (file no. 9195) filed concurrently herewith.

One type of roller is disclosed in Canadian Pat. No. 43,784, issued to Hoffman, July 31, 1893, which comprised a wheel or roller composed of two metal parts or shells held together by a spring device located within the wheel or shell, the spring device engaging with the inner surface of each of the shells. Obviously, the manufacture of such hollow wheel or roller is expensive and time consuming.

Another form of globular roller merely consists of a central spool upon which is secured a solid rubber roller. Obviously, such solid roller would be subject to severe elastic deformations during use and would not necessarily provide a suitable structurally rigid, yet resilient wheel.

SUMMARY OF THE INVENTION (i) Aims of the Invention

Accordingly, an object of the present invention is to provide a novel globular roller having the required characteristics of both strength and resiliency.

Another object of this invention is to provide a procedure for the preparation of such a globular roller.

(ii) Statements of Invention

By this invention, globular rollers are provided comprising either one unitary globular or semi-globular segments or rigid structurally strong material; if two semi-globular rollers are provided then one of said semi-globular segments is provided with a male flange, and the other of said semi-globular segments is provided with a female recess; the two semi-globular segments are joined at the male flange/female recess seam, the fit being either a free fitting or preferably an interference fit, which provides the means of creating a single globular ball when the two semi-globular segments are pressed together; and a resilient material is coated thereon, where necessary permanently joining said two semi-globular segments together; the roller is provided with a pair of diametrically opposed aligned apertures or recesses disposed within a pair of diametrically opposed flattened chords i.e. the residual solid remaining when a slice is removed from the globule of the globular rollers.

By this invention a method is also provided for making a globular roller, including the steps of impact extruding a single unitary globular roller or a pair of semi-globular segments of rigid structurally secure material, and, if two semi-globular segments are provided, one of the semi-globular segments including a flattened chord penetrated by an aperture or a recess and including an open circumferential end provided with a male flange, the other of the two segments including a flattened chord penetrated by an aperture or a recess and including an open circumferential end provided with a female recess; assembling the male flange and female recess at a seam to provide a globular roller assembly and finally, applying a coating of a resilient material to the assembled semi-globular segments, thereby, if necessary, permanently to secure the semi-globular segments together, and thereby to provide a globular roller having a resilient surface.

(iii) Other Features of the Invention

In one variant, the segments are formed of impact extruded metal, for example, aluminum, tin, copper, zinc, etc., or of injection molded structurally rigid synthetic plastic material, for example, nylon, polycarbonate resin, ABS resins, etc.

In another variant, the resilient material coating is provided by natural or synthetic rubbers, for example, butyl rubber, acrylonitrile rubber, butadiene rubber, etc., or a synthetic plastic material, for example, polyvinyl chloride, polyurethane, etc.

In yet another variant, the two semi-globular segments are joined at an interference fit.

In another variant of the invention, the two diametrically opposed apertures are fitted with bearing members which conveniently may be ball bearings or cylindrical roller bearings or non-cylindrical roller bearings.

In another variant, the bearings are provided with a transverse shaft rotatedly mounted and secured within the roller.

In yet another variant of the invention, the impact extrusion is carried out by the sequential steps of allowing a slug of the rigid structurally strong material to slide down an inclined chute towards a hollow anvil of the required semi-globular shape and applying a pressure with a plunger to the slug in order to cause the slug to be deformed into the shape of the hollow anvil.

In yet another variant, the resilient coating over the assembled semi-globular segment is molded therearound.

BRIEF DESCRIPTION OF THE DRAWINGS

In the accompanying drawings

Figure 1:
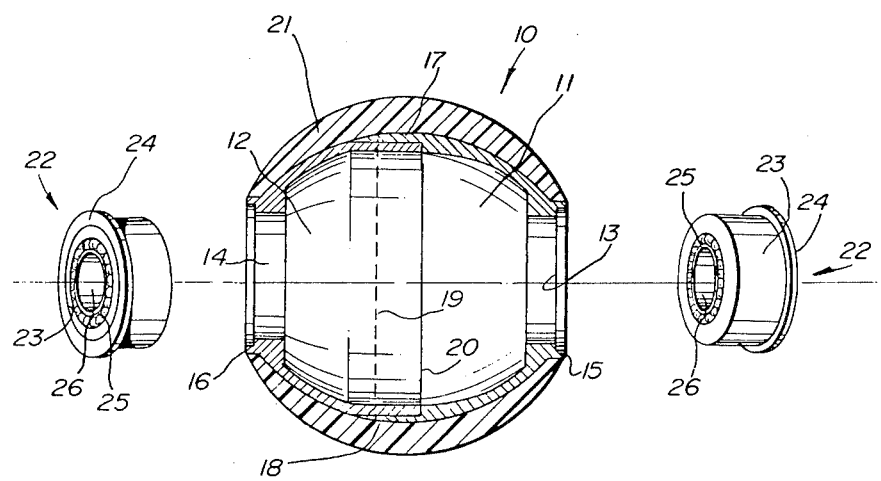
FIG. 1 is a composite view showing the globular roller in cross section, and showing the bearings in isometric view.

DESCRIPTION OF PREPARED EMBODIMENTS (i) Description of FIG. 1

As seen in FIG. 1, the globular roller 10 is provided by a pair of semi-globular segments 11, 12, these segments including a flattened chord section 13, 14, and having a raised circumferential flange-like lip 15, 16, around the opening thereof. Semi-globular segment 11 is provided with a female recess 17 along its open edge 19, while semi-globular segment 12 is provided with a male flange 18 along its circumferential edge 20.

The semi-globular segments 11, 12, (or a unitary globular roller) may conveniently be formed by a procedure known as impact extrusion. In this procedure, which is known to persons skilled in the art, but which will be briefly described hereinafter, a slug of the suitable material is caused to slide down an inclined chute towards a dished out anvil which acts as a mold. The anvil is dished out to provide the precise shape of the semi-globular segment, including the open chord 13, 14, the circumferential flange or lip 15, 16, the open circumferential edges 19, 20 and the female recess 17 and male flange 18. As the slug approaches the interior adjacent the bottom of the anvil, it is impacted by a plunger at a pressure of approximately 100 tons per square inch or more, this impact causing an almost instantaneous liquification of the slug and causing it to conform to the shape of the anvil mold.

Any suitable structurally rigid material which can be impact extruded, may be used. Examples of suitable such material include metals, for example, aluminum, tin, copper, zinc, etc. If the globular roller is formed by plastic injection, synthetic plastic materials which may be used include for example, nylon, ABS plastic, polycarbonate, polystyrene, etc.

After the two semi-globular segments 11, 12, are produced, they are assembled preferably by an interference fit (or the in situ formed globular roller is provided) and then a coating of an elastically deformable resilient material 21 is applied thereon, in order, if necessary firstly to secure the two segments permanently together, and secondly, to provide a resilient outer coating. This resilient outer coating 21 may be formed by extruding directly on the assembled globular roller assembly or by injection molding therearound or by compression molding. This resilient coating 21 may be a rubbery material, for example, natural rubber, or synthetic rubbers, for example, butyl rubber, buna rubber, acrylonitrile rubber, etc., or a synthetic plastics material, for example, polyurethanes, polyvinyl chlorides, polyethylenes, etc.

The globular rollers 10 are completed by the provision of bearings, bushings or the like, 22 secured to the openings 13, 14. Each bearing 22 includes an outer substantially cylindrical race 23, provided with a protruding circular flange 24, and an innner race 25 rotatably mounted and secured thereto. Between inner race 25 and outer race 23 are suitable bearing surfaces, for example, ball bearings, cylindrical roller bearings or non-cylindrical roller bearings.

Figure 2:
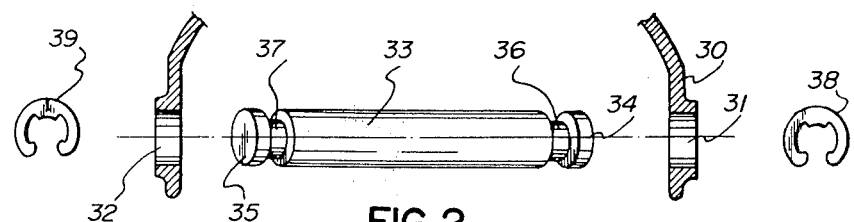
FIGS. 2 and 3 are partial isometric views showing alternative ways of rotatably mounting the globular roller.

(ii) Description of FIG. 2

Figure 3:
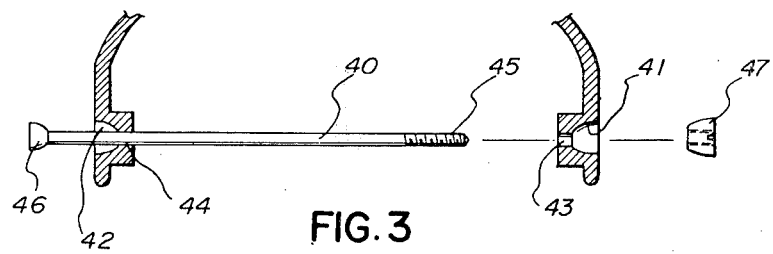

Two alternative ways of rotatably mounting the globular roller on a transverse shaft are shown in FIGS. 2 and 3. In FIG. 2, a yoke 30 is provided with a pair of aligned apertures 31, 32 provided therein. A transverse shaft 33 is inserted in the central bushing apertures 26 in the bearings 22 and the ends 34, 35 of the shaft are placed through apertures 31, 32. The shaft ends 34, 35 are each provided with a circumferential channel 36, 37, within which are placed retaining rings 38, 39, conveniently those known by the Trade Mark "CIRCLIP".

(iii) Description of FIG. 3

In one embodiment shown in FIG. 3 the yoke 30 is provided with a pair of aligned recesses 41, 43 penetrated by apertures 43, 44. Transverse shaft 40 is fitted through recess 42 and aperture 44 and then into bushing aperture 26 of bearing 22 and through aperture 43 and recess 41. One end 45 of shaft 40 is threaded to receive topped retaining nut 47, which is fitted within recess 41. The other end of shaft 40 is provided with a knob 46 to fit into recess 42.

Figure 4:
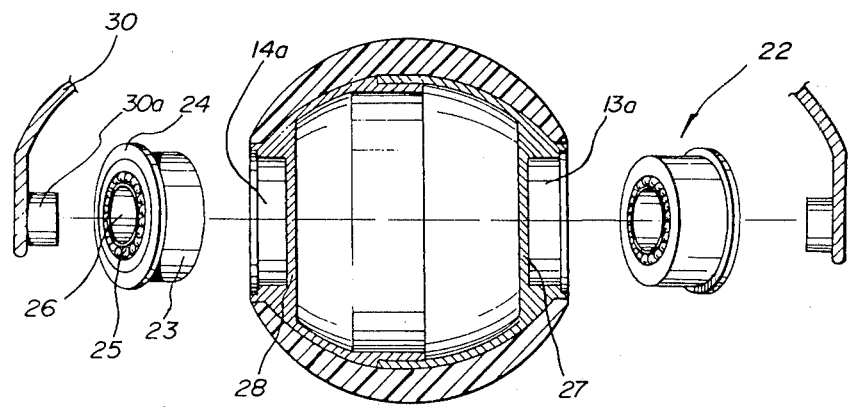
FIG. 4 is a view similar to that of FIG. 1 showing another aspect of this invention.

(iv) Description of FIG. 4

The embodiment shown in FIG. 4 is similar in almost all respects to that of FIG. 1 and so the same reference numbers will be used. However, instead of apertures 13 and 14, the semi-globular segments are provided with recesses 13A, 14A respectively which are provided with floor 27, 28 respectively.

Bearings 22 fit into recesses 13A and 13B and, in use, uoke 30 is prestressed to urge stub shaft 30A into the bushing 26 of bearing 22.

(v) Description of Impact Extrusion Technique

As noted before, impact extrusion is a procedure known to those skilled in the art. Impacting combines extrusion and forging and has therefore been called variously impact extruding, cold pressing, extrusion forging, cold forging, extrusion pressing, impact extruding and the like. The process itself is relatively simple. The metal slug to be impacted, its volume carefully predetermined with an accuracy of anywhere from 1% to 10%, is placed in a die. A single stroke punch — sometimes called a ram or mandrel — comes down at a high speed. The developed pressure extrudes the metal through designed openings. These orifices may be in the sides of the die, the bottom of the die or between the die and the punch. The metal that is not extruded is held between the bottom of the punch and the inside of the die. This portion of the metal is forged.

Plastic flow begins when the yield point of the metal is exceeded and extrusion ensues when the pressure has increased approximately 7 to 15 times initial yield pressure. The pressure necessary for impacting depends on the metal as well as the complexity of the shape to be formed. The harder the metal the greater the pressure.

There are three types of impacts: reverse, forward and combination, and these are named after the principal direction in which the metal flows under the pressure developed by the punch.

Reverse impacting is used to make shells with a forged base and extruded sidewalls. A blank of material (slug) which is to be extruded is placed in a die cavity and struck by a punch, forcing the metal to flow upward around the punch, through the opening between punch and die, to form a simple shell.

Outside diameters can be stepped, but the inside diameter should be straight. Short steps, however, if necessary, can be incorporated on the inside, near the bottom of the part.

The clearance between punch and die determines the wall thickness of the impact. The base thickness is determined by adjustment of the bottom position of the press ram and should be a minimum of 15% greater than side wall thickness as impacted. In general, the sidewalls should be perpendicular to the base. Multi-wall shells, internal or external ribs and circular oval, rectangular, square or other cross sections can be produced.

In the reverse impacting process there is a tendency for the punch to "wander" in producing the longer pieces.

Sometimes called the Hooker process, the forward method somewhat resembles conventional extruding in that metal is forced through the orifice of a die by the action of a punch, causing the metal to flow in the direction of punch travel. The punch fits the walls of the die so closely that no metal escapes backwards. The metal is used for forming round, non-round, straight and ribbed rods and thin-walled tubing with one or both ends open, and with parallel or tapered side walls. Fillets may also be incorporated into the design. Some large parts, such as transmission shafts, may be made by forward impacting.

Hollow or semi-hollow parts with a heavy flange and multiple diameters formed on the inside and outside are often made by forward impacting.

A combination impact is, as the name implies, a combination of forward and reverse metal flow. This method is used to produce complex-shaped parts. The metal is confined inside the cavity between the upper and lower punches, forcing it to flow both up and down. If a solid slug is used a web is left; if a hollow slug is used, a tubular part is formed.

By incorporating a cavity in the punch, the metal is allowed to flow upward into the punch, until the cavity is filled. Further punch movement causes forward extrusion of the remaining metal.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A method for making a globular roller, comprising the steps of: impact extruding a pair of semi-globular segments of rigid structurally secure impact extrudable material, said segments being assemblable into a globular roller, one of said semi-globular segments including a flattened chord penetrated by a well recess and having an open circumferential end provided with a male flange, the other of said segments including a flattened chord penetrated by a well and having an open circumferential end provided with a female recess; assembling said two segments with the male flange of one mating with the female recess of the other at a seam to provide a globular roller assembly; and finally, applying a coating of a resilient material to the assembled semi-globular segments, thereby permanently to secure the semi-globular segments together, and providing said globular roller.

2. The method of claim 1 wherein each said well of said flattened chord is punctured by an aperture.

3. The method of claim 1 wherein each said well of said flattened chord terminates in a floor.

4. The method of claim 1 wherein, the impact extrusion is carried out by the sequential steps of allowing a slug of the rigid structurally strong material to slide down an inclined chute towards a hollow anvil of the required semi-globular shape, and applying a pressure with a plunger to said slug in order to cause the slug to be deformed into the shape of the hollow anvil.

5. The method of claim 1 wherein the resilient coating over the assembled semi-globular segment is molded therearound.

* * * * *